United States Patent Office 3,336,311
Patented Aug. 15, 1967

3,336,311
TOTAL SYNTHESIS AND NOVEL DERIVATIVES OF ERGOT ALKALOIDS
Albert Hofmann, Bottmingen, Switzerland, and Albert Frey, Essex Fells, and Hans Ott, Convent Station, N.J., assignors to Sandoz Ltd. (also known as Sandoz A.G.), Basel, Switzerland
No Drawing. Filed July 9, 1965, Ser. No. 470,881
Claims priority, application Switzerland, May 10, 1961, 5,499/61; Nov. 8, 1962, 13,069/62; Oct. 26, 1964, 13,839/64, 13,840/64
10 Claims. (Cl. 260—268)

The present application is a continuation-in-part application of our U.S. application Ser. No. 287,527, filed June 13, 1963 which in turn was a continuation-in-part application of our application Ser. No. 193,318, filed May 8, 1962, both now abandoned.

This invention relates to a process for the production of ergot alkaloids. More particularly, the invention comprises a process for the production of chemical compounds of the formula:

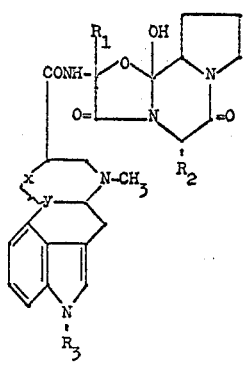

wherein $R_1$ and $R_3$ are hydrogen or lower alkyl and $R_2$ is hydrogen, lower alkyl or benzyl and $\widehat{x\ y}$ is —CH=C< or

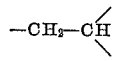

The ergot alkaloids and some of their synthetic derivatives are of great importance as therapeutics. Whilst that constituent of ergot, however, which has an utero-tonic activity, i.e. ergobasine (also known as ergometrine or ergonovine), has been prepared synthetically for some time, the ergot alkaloids of the peptide type, ergotamine and the alkaloids of the ergotoxine group, which are used as sedatives, oxytocics and as most efficient remedy against migraine headache, have only been obtainable from the naturally occurring material. Also the 9,10-dihydro-derivatives of ergotamine and of the ergotoxines were till now only obtainable in a semisynthetic way from the corresponding nature alkaloids. The peptide portion of these alkaloids is extremely complex and thus has hitherto hindered their synthetic production.

It must be stressed here that, while some of the ergot alkaloids have been known for a great number of years and, due to their therapeutic properties have been in great demand for an equal number of years so that numerous attempts have undoubtedly been made to produce them synthetically, more than 40 years have elapsed between the first isolation of ergotamine and its first total synthesis which forms part of the present invention.

We have now found that the ergot alkaloids of the peptide type and their derivatives can be obtained by reaction of a compound of the formula:

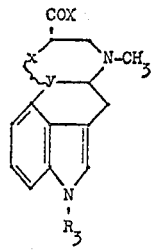

in which $R_3$ and $\widehat{x\ y}$ have the above significance and X is a chlorine or bromine atom or the radical —OSO$_3$H, whereby the acid halides are used in form of their hydro halides, with a salt of the formula:

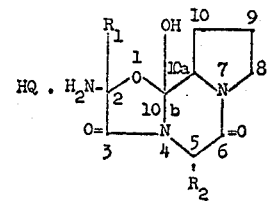

in which $R_1$ and $R_2$ have the above significance and Q is an anion of an inorganic or a strong organic acid, in the presence of a tertiary base.

When a (+)-lysergic acid halide hydrohalide, e.g. (+)-lysergic acid chloride hydrochloride, is used for the reaction, it may be suspended together with the amine salt III in an inert solvent, e.g. chloroform, and a tertiary amine, e.g. tributyl amine, added. The reaction mixture may be concentrated, diluted with a water immiscible solvent, e.g. methylene chloride, chloroform or ethyl acetate, and the basic constituents removed by shaking with a dilute aqueous solution of an organic acid, e.g. acetic acid or tartaric acid. Subsequently the aqueous solution may be made alkaline and extracted with an organic solvent (e.g. ethyl acetate or ether), the extract dried and the solvent evaporated. The resulting crude product may subsequently be purified by chromatography on aluminium oxide and subsequent crystallization. When the anhydride of (+)-lysergic acid or (+)-9,10-dihydrolysergic acid with sulfuric acid is used for the reaction, it is produced in situ by reacting (+)-lysergic acid or (+)-9,10-dihydrolysergic acid with sulfuric acid. The resulting anhydride is then reacted with the amine salt III.

In this particular process a suspension of the amine salt and the calculated quantity of a tertiary base in dimethyl formamide may be added to a freshly prepared solution of the anhydride in dimethyl formamide at 0° and the reaction mixture may be further worked up as described above.

The (+)-lysergic acid halide hydrohalides (described and claimed in our U.S. Patent No. 3,084,164) may, for example, be produced as follows: Finely divided (+)-lysergic acid is suspended in freshly distilled phosphorus oxychloride and freshly sublimated, finely pulverized phosphorus pentahalide is added while stirring. The reaction mixture is shaken at room temperature and then heated to 90°. The phosphorus oxychloride is then evaporated off in a water jet vacuum and the remaining grey powder washed twice with hexane.

The amine salts of the Formula III (described and claimed in our application Ser. No. 193,303, filed May 8, 1962 and now abandoned in favour of a CIP application Ser. No. 298,410, filed July 29, 1963 which describes the same subject matter) may be produced as follows:

A 2-bromo-2-alkyl ($C_1$–$C_3$) or 2-bromo-malonic acid dialkyl (alkyl $C_1$–$C_4$) ester is converted with sodium benzylate and the resulting 2-benzyloxy malonic acid dialkyl ester saponified with the calculated quantity of an alcoholic potassium hydroxide solution to form the 2-benzyloxy malonic acid semi-ester. This is reacted with a thionyl halide to produce a 2-benzyloxy-malonic acid halide monoalkyl ester of the formula:

(IV)

in which $R_1$ has the above significance, $R_4$ is an alkyl radical containing from 1 to 4 carbon atoms inclusive and Hal is chlorine or bromine which is converted with a diketo-piperazine of the formula:

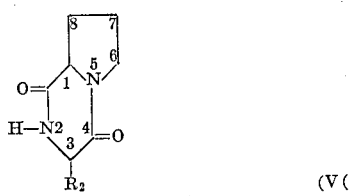
(V)

in which $R_2$ has the above significance, to form a compound of the formula:

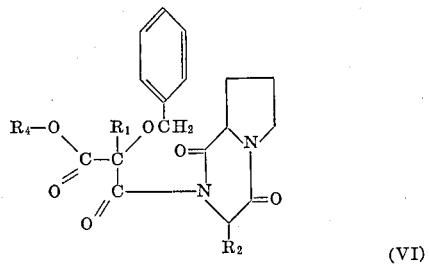
(VI)

in which $R_1$, $R_2$ and $R_4$ have the above significance. The benzyloxy radical of this compound is then converted to the free hydroxyl radical by hydrogenating the compound VI in glacial acetic acid or alcohol or a mixture of these solvents at a pressure of 2–80 atmospheres in the presence of a palladium catalyst. Spontaneous cyclization occurs to form a compound of the formula:

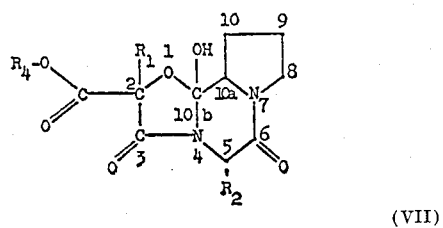
(VII)

in which $R_1$, $R_2$ and $R_4$ have the above significance.

The compound VII is converted to the corresponding amino compound in manner known per se.

Two diastereoisomers are formed if a racemic compound IV is used as starting material whilst the optically pure product is obtained by using an optically active compound IV which may be produced in manner known per se.

To produce the natural ergot alkaloids, e.g. (+)-ergotamine, in accordance with the above process, it is necessary to use an amine salt III the configuration of which corresponds to the peptide portion of the natural ergot alkaloids to be produced. Should other amine salts be used, compounds having a similar structure but differing in the configuration at one or more of the asymmetric centers, result.

It is also within the scope of the present invention to produce the compound III, used in the process of the invention, in such a way that the ester radical of the compound of general Formula VII is saponified to form the corresponding free acid which is converted to the corresponding acid chloride and subsequently to the corresponding azide in manner known per se, the azide is heated in a non-polar solvent to produce the isocyanate which is reacted with benzyl alcohol to give the corresponding benzyl urethane which is then hydrogenated in solution in the presence of a mineral acid to produce the desired amine salt III.

The pharmacological utility of the known alkaloids is so well known that it requires no repetition here. The new alkaloids, however, produced in accordance with the present invention, namely, Ergostine, Dihydro-Ergostine, Ergovaline and Dihydro-Ergovaline have remarkable and unexpected pharmacological properties. This is brought out all the more clearly by a comparison with the known ergot alkaloids.

The best known ergot alkaloids in the field of medicine are Ergotamine, which is an alkaloid of the peptide type, and Ergotbasine, which is an alkaloid of the Alkanolamide type. The toxicity data given in the following table (LD 50 values) were calculated from tests performed on rabbits to whom the compound was administered intravenously. The adrenosympathicolytic activity was measured on isolated seminal vesicles of guinea pigs while the uterotonic activity was measured on the rabbit uterus in situ. For comparative purposes the adrenosympathicolytic and uterotonic activities have been expressed in the table relative to Ergotamine, i.e. on a scale on which Ergotamine=100%.

The difference between the four new alkaloids and Ergobasine is striking. All four have a marked adrenosympathicolytic activity while Ergobasine is devoid of this property.

In comparison with Ergotamine, the four new alkaloids are characterized by a considerably higher specificity of activity of a number of their cardinal properties. Thus, for example, the adrenosympathicolytic activity of Ergostine compared with its uterotonic activity is seven times more specific than in the case of Ergotamine. The specificity of this property is even higher in the case of Dihydro-Ergostine and Dihydro-Ergovaline as these two compounds no longer exhibit a uterotonic activity. In the case of Ergovaline, the specificity of the uterotonic activity, in comparison with the adrenosympathicolytic activity, is three times greater than in the case of Ergotamine. The enormous advantages accruing from such a specificity of activity will be readily appreciated by those skilled in the art.

Furthermore, Dihydro-Ergostine and Dihydro-Ergovaline have the added and extremely important advantage of being considerably less toxic than Ergotamine and Ergobasine. As may be seen from the table, they are from five to ten times less toxic.

The term "known" as used herein designates methods described in the literature on the subject or in actual use. In the following nonlimitative examples all temperatures are stated in degrees centigrade.

| Alkaloid | Toxicity Rabbits, i.v. $LD_{50}$, mg./kg. | Adrenosympathicolytic Effect A, percent | Uterotonic Effect U, percent | A/U |
|---|---|---|---|---|
| Ergotamine | 3.1 | 100 | 100 | 1 |
| Ergostine | 1.55 | 300 | 42 | 7 |
| Dihydro-Ergostine | 16.00 | 1,400 | None | ∞ |
| Ergovaline | 3.00 | 50 | 150 | 0.33 |
| Dihydro-Ergovaline | 30.00 | 70 | None | ∞ |
| Ergobasine | 3.45 | (¹) | 100 | ≅0 |

¹ Minimum, only traces.

*Example 1.—(+)-ergotamine*

(a) *2-benzyloxy-2-methyl-malonic acid diethylester.—* 44.3 g. of a sodium hydride suspension (50%) in oil are suspended in 1.25 litres of toluene and 91.3 g. of benzyl alcohol are added dropwise at room temperature whilst stirring and the mixture then boiled at reflux for 1 hour. 214.8 g. of 2-bromo-2-methyl-malonic acid diethylester are then added dropwise to the cooled solution and the reaction mixture is boiled at reflux for a further 2 hours, then poured onto ice, the mixture made acidic with dilute hydrochloric acid and extracted with ether. The ethereal solution is washed consecuctively with water, a sodium bicarbonate solution and a saturated solution of sodium chloride. After evaporation in a vacuum the 2-benzyloxy-2-methyl-malonic acid diethylester results as a yellowish oil having a boiling point of 120–125° at 0.01 mm. of Hg.

(b) *2-benzyloxy-2-methyl-malonic acid chloride monoethylester.*—181.3 g. of crude 2-benzyloxy - 2 - methyl-malonic acid diethylester are dissolved in 693 cc. of absolute alcohol at room temperature and a solution of 36.4 g. of potassium hydroxide in 450 cc. of absolute alcohol is added whilst cooling with ice. The reaction solution is left to stand for 15 hours at room temperature and then evaporated in a vacuum at a bath temperature of 40°, the residue taken up in a mixture of 500 cc. of a concentrated $NaHCO_3$ solution and 500 g. of ice, extracted with ether and made acid with an ice cold 10% phosphoric acid and the separated oil taken up in methylene chloride. After evaporation of the solvent in a vacuum the crude 2-benzyloxy-2-methyl-malonic acid monoethylester remains as a yellow oil. 320 cc. of thionyl chloride are added to 265.6 g. of 2-benzyloxy-2-methyl-malonic acid monoethylester and the mixture is boiled at reflux for 2 hours. The excess thionyl chloride is then distilled off in a vacuum and the residue distilled in a high vacuum. The resulting 2-benzyloxy-2-methyl-malonic acid chloride monoethylester has a boiling point of 138–141° at 0.03 mm. of Hg $$n_D^{20} = 1.5150$$

(c) *2-(2 - benzyloxy-2-methyl-O-ethyl-malonyl)-3-benzyl-1,4-diketo-octahydro-pyrrolo[1,2-a]pyrazine.*—A solution of 92.5 g. of 3-benzyl-1,4-diketo-octahydro-pyrrolo-[1,2-a]pyrazine (produced from L-phenylalanine and L-proline) in 580 cc. of absolute pyridine is cooled to −30° and 95.5 g. of 2-benzyloxy-2-methyl-malonic acid chloride monoethylester are added dropwise whilst stirring. The reaction is left to stand for 15 hours at 0° and 100 cc. of water are added, the mixture is stirred for a further half hour at 0° and then poured onto ice, made acid to Congo red indicator with an 18% hydrochloric acid and extracted a number of times with methylene chloride. The organic extracts are washed consecutively with a 2 N hydrochloric acid, water and a concentrated sodium bicarbonate solution, dried with sodium sulfate and the solvent removed in a vacuum. The residue is taken up in ether, the ethereal solution washed well a number of times with water, dried again and evaporated in a vacuum, the 2-(2-benzyloxy-2-methyl-O-ethyl-malonyl) - 3 - benzyl - 1,4 - diketo-octahydro-pyrrolo[1,2-a]pyrazine resulting as a light yellow oil. This is a diastereoisomer mixture of the D,L,L- and L,L,L-compound as the optically active 3-benzyl-1,4-diketo - octahydro-pyrrolo[1,2-a]pyrazine was converted with D,L-2-benzyloxy-2-methyl-malonic acid chloride monoethylester. The two isomers may be separated by chromatography on silica gel with a mixture of chloroform containing 0.5% of methanol. However, it is advantageous to convert the mixture further as the two isomer cycloesters of the following stage may be separated by crystallization.

(d) *2 - ethoxycarbonyl-2-methyl-5-benzyl-10b-hydroxy-3,6 - dioxo-octahydro-oxazolo[3,2-a]pyrrolo[2,1-c]pyrazine.*—A solution of 146 g. of 2-(2-benzyloxy-2-methyl-O - ethyl-malonyl)-3-benzyl-1,4-diketo-octahydro-pyrrolo-[1,2-a]pyrazine in 500 cc. of glacial acetic acid is added to a suspension of 145 g. of pre-hydrogenated palladium (5%) on aluminium oxide in 500 cc. of glacial acetic acid. By shaking over night in an atmosphere of hydrogen approximately 10 litres of hydrogen are taken up. The catalyst is then filtered off and the solution evaporated in a vacuum. The oily residue is taken up in methylene chloride, the solution washed a number of times with water and dried over sodium sulfate. After evaporation of the solvent a colourless oil results from which the 2 - ethoxycarbonyl - 2 - methyl-5-benzyl-10b-hydroxy-3,6-dioxo - octahydro - oxazolo[3,2-a]pyrrolo[2,1-c]pyrazine, isomer B, crystallizes upon the addition of a little ethyl acetate. Melting point 202–204°, $[\alpha]_D^{20} = -35°$ (c.=1 in pyridine). The mother liquor is again evaporated so that an oil forms and is recrystallized from a little ethyl acetate. Isomer A, melting point 135–136°, $[\alpha]_D^{20} = -34°$ (c.=0.2 in pyridine).

(e) *2 - carboxy - 2 - methyl-5-benzyl-10b-hydroxy-3,6-dioxo-octahydro-oxazolo[3,2-a]pyrrolo[2,1-c]pyrazine.*— 65 cc. of a 1 N sodium hydroxide solution are added to 10 g. of 2-ethoxycarbonyl-2-methyl-5-benzyl-10b-hydroxy-3,6 - dioxo - octahydro - oxazolo[3,2-a]pyrrolo[2,1-c]pyrazine. The clear solution is left to stand at room temperature for two hours and 65 cc. of a 1 N hydrochloric acid are added whilst cooling with ice and the mixture left to crystallize at 0°. 2-carboxy-2-methyl-5-benzyl-10b-hydroxy - 3,6 - dioxo - octahydro - oxazolo[3,2-a]pyrrolo-[2,1-c]pyrazine results. Isomer A: melting point 120–122°, $[\alpha]_D^{20} = -10°$ (c.=0.2 in pyridine). Isomer B: melting point 201–202° (decomposition), $[\alpha]_D^{20} = -42°$ (c.=1 in pyridine).

(f) *2 - chlorocarbonyl-2-methyl-5-benzyl-10b-hydroxy-3,6 - dioxo-octahydro-oxazolo[3,2-a]pyrrolo[2,1-c]pyrazine.*—1.115 g. of sodium and then 17.4 g. of 2-carboxy-2-methyl - 5 - benzyl - 10b - hydroxy-3,6-dioxo-octahydro-oxazolo[3,2-a]pyrrolo[2,1-c]pyrazine are dissolved in 224 cc. of absolute methanol whilst cooling with ice until the solution is clear and the solution is then evaporated to dryness in a vacuum. The residue is dried in a high vacuum for 1 hour at 100° and suspended in 150 cc. of oxalyl chloride whilst cooling with ice and the dispersion then stirred well at 0° for half an hour and at room temperature for 1 hour. The excess oxalyl chloride is then distilled off in a vacuum, the residue taken up in absolute methylene chloride, the solution filtered, again evaporated to dryness and the resulting 2-chlorocarbonyl-2 - methyl - 5 - benzyl-10b-hydroxy-3,6-dioxo-octahydro-oxazolo[3,2-a]pyrrolo[2,1-c]pyrazine recrystallized from ether. Isomer A: melting point 125–126°. Isomer B: melting point 173–174°, $[\alpha]_D^{20} = +14°$ (c.=0.5 in $CHCl_3$).

(g) *2 - azidocarbonyl-2-methyl-5-benzyl-10b-hydroxy-3,6 - dioxo-octahydro-oxazolo[3,2-a]pyrrolo[2,1-c]pyrazine.*—12 g. of 2-chlorocarbonyl-2-methyl-5-benzyl-10b-hydroxy - 3,6 - dioxo - octahydro - oxazolo[3,2-a]pyrrolo-[2,1-c]pyrazine are dissolved in 500 cc. of acetone and a solution of 2.58 g. of sodium azide in 8 cc. of water is added dropwise whilst stirring. The reaction mixture is then stirred vigorously for 1 hour, the solution evaporated in a vacuum, the residue stirred into 1000 cc. of water and the aqueous solution extracted with methylene chloride. After evaporation of the solvent the 2-azidocarbonyl-2-methyl - 5 -benzyl - 10b - hydroxy-3,6-dioxo-octahydro-oxazolo[3,2-a]pyrrolo[2,1-c]pyrazine results. Isomer A: melting point approximately 100° (decomposition), $[\alpha]_D^{20} = -42°$ (c.=0.3 in pyridine). Isomer B: melting point approximately 130° (decomposition), $[\alpha]_D^{20} = +24°$ (c.=1 in $CHCl_3$).

(h) *2 - isocyano - 2 - methyl-5-benzyl-10b-hydroxy-3,6-dioxo - octahydro - oxazolo[3,2-a]pyrrolo[2,1-c]pyrazine (isomer B).*—193 mg. of 2-azidocarbonyl-2-methyl-5-benzyl-10b-hydroxy-3,6-dioxo - octahydro-oxazolo[3,2-a] pyrrolo[2,1-c]pyrazine are heated in 2 cc. of toluene for 4 minutes to 130° with the formation of nitrogen. Upon cooling the 2-isocyano-2-methyl-5-benzyl-10b-hydroxy-3,6 - dioxo-octahydro-oxazolo[3,2-a]pyrrolo[2,1-c]pyrazine crystallizes from the solution in an almost quantitative yield. Melting point 153–154° in an evacuated tube, $[\alpha]_D^{20} = +45°$ C. (c.=1 in $CHCl_3$).

(i) *2 - benzyloxycarbonyl - 2 - methyl-5-benzyl-10b-hydroxy - 3,6 - dioxo - octahydro - oxazolo[3,2 - a]pyrrolo-[2,1-c]pyrazine.*—872 mg. of 2-azidocarbonyl-2-methyl-5-benzyl-10b-hydroxy-3,6-dioxo-octahydro-oxazolo[3,2-a]pyrrolo[2,1-c]pyrazine in 5 cc. of absolute benzyl alcohol are heated for 5 minutes to 130° accompanied by a strong evolution of nitrogen. The excess benzyl alcohol is subsequently evaporated in a high vacuum and the residue recrystallized from ether. Isomer A: melting point 172–174°, $[\alpha]_D^{20}=-4°$ (c.=0.3 in pyridine). Isomer B: melting point 224–225°, $[\alpha]_D^{20}=-45°$ (c.=1 in pyridine).

(j) *2-amino-2-methyl-5-benzyl-10b-hydroxy-3,6-dioxo-octahydro-oxazolo[3,2-a]pyrrolo[2,1-c]pyrazine chlorohydrate.*—A solution of 11 g. of 2-benzyloxycarbonyl-amino-2-methyl-5-benzyl-10b-hydroxy - 3,6 - dioxo - octahydro-oxazolo[3,2-a]pyrrolo[2,1-c]pyrazine in 200 cc. of a mixture of equal parts of methanol and methylene chloride containing 8 cc. of a methanolic hydrochloric acid (360 mg. HCl per cc.) is added to a suspension of 24 g. of 5% pre-hydrogenated palladium on aluminium oxide in 96 cc. of absolute methanol containing 40 cc. of methylene chloride. The reaction mixture is shaken for 45 minutes at room temperature in an atmosphere of hydrogen, 540 cc. of hydrogen being used. The catalyst is filtered off from the resulting colourless solution, the mixture evaporated in a vacuum and the residue taken up in ether, the chlorohydrate of the amine precipitating as an amorphous powder. The latter is washed three times with absolute ether and then dried over phosphorus pentoxide. The hydrochloride of the 2-amino-2-methyl-5-benzyl-10b-hydroxy-3,6-dioxo - octahydro-oxazolo[3,2-a]pyrrolo[2,1-c]pyrazine chlorohydrate results. Isomer A: melting point range 170–183°. Isomer B: melting point 131–133° (decomposition) (amorphous, light yellow, hygroscopic powder).

(k) *(+)-lysergic acid chloride hydrochloride.*—536 mg. of (+)-lysergic acid are finely suspended in 10 cc. of freshly distilled phosphorus oxychloride and 416 mg. of finely pulverized, freshly sublimated phosphorus pentachloride are added thereto whilst stirring. The reaction mixture is shaken for 2 minutes at room temperature, then heated to 90° and left at this temperature for 2 minutes. The phosphorus oxychloride is then evaporated off in a water jet vacuum and the remaining powder dissolved twice in n-hexane and the solvent again evaporated in a vacuum, so as to remove the volatile impurities azeotropically. The (+)-lysergic acid chloride hydrochloride resulting as a light grey crystalline powder has a melting point of 310–315° in an evacuated tube.

(l) *(+)-lysergic acid sulfuric acid anhydride.*—212 mg. of lithium hydroxide are added to a solution of 1.43 g. of (+)-lysergic acid monohydrate in 50 ml. of methanol and the solvent is evaporated in a vacuum. The residue is dissolved in 100 ml. of anhydrous dimethyl formamide, half the solvent is distilled off for the purpose of the azeotropic removal of the remaining water, the resulting anhydrous solution is cooled to 0° and 10 ml. of a 1 molar solution of $SO_3$ in dimethyl formamide quickly added whilst stirring. The resulting solution of the anhydride is immediately used for further reaction.

(m) *(+)-ergotamine.*—The (+)-ergotamine is obtained in the shape of prisms from 570 mg. of 2-amino-2-methyl-5-benzyl - 10b - hydroxy - 3,6 - dioxo - octahydro-oxazolo[3,2-a]pyrrolo[2,1-c]pyrazine chlorohydrate (isomer A) and 570 mg. of (+)-lysergic acid chloride hydrochloride in a manner analogous to that described in Example 2(b). Melting point approximately 180°, $[\alpha]_D^{20}=-158°$ (c.=0.5 in chloroform).

(n) *(+)-ergotamine.*—The solution of the (+)-lysergic acid sulfuric acid anhydride in dimethyl formamide obtained according to sub-section (1) is cooled to 0° and a suspension of 7 g. of 2-amino-2-methyl-5-benzyl-10b-hydroxy - 3,6 - dioxo - octahydro - oxazolo[3,2-a]pyrrolo[2,1-c]pyrazine chlorohydrate (isomer A) in 30 cc. of dimethyl formamide is added. 5 ml. of tributyl amine are added dropwise at 0°, the mixture is stirred for a further 10 minutes at 0°, 100 ml. of water and 50 ml. of a saturated aqueous sodium chloride solution are subsequently added and the ergotamine extracted by shaking 10 times, each time with 50 ml. of ethyl acetate. The combined ethyl acetate extracts are shaken 5 times, each time with 50 ml. of a 50% aqueous acetic acid solution, the combined aqueous extracts made alkaline with $NaHCO_3$ and again extracted with ethyl acetate. The organic phase is dried over sodium sulfate and evaporated. By chromatographing the evaporation residue on aluminium oxide and crystallization from aqueous acetone, pure ergotamine results in the shape of prisms having a melting point of 180°.

*Example 2.—(+)-9,10-dihydroergotamine*

(a) *9,10-dihydro-(+)-lysergic acid chloride.*—The hydrochloride of 9,10-dihydro-(+)-lysergic acid chloride having a melting point of 325–330° (decomposition) is produced from 9,10-dihydro-(+)-lysergic acid in a manner analogous to that described in Example 1(k).

(b) *(+)-9,10-dihydroergotamine.*—1 g. of 2-amino-2-methyl-5-benzyl - 10b - hydroxy - 3,6 - dioxo - octahydro-oxazolo[3,2-a]pyrrolo[2,1-c]pyrazine chlorohydrate (isomer A) and 1 g. of 9,10-dihydro-(+)-lysergic acid chloride hydrochloride are suspended in 50 cc. of a mixture of chloroform and tertiary butanol (3:1) and a solution of 1.6 g. of tributyl amine in 50 cc. of the same solvent mixture is added dropwise, the mixture is stirred at room temperature for 15 minutes, the solvent evaporated in a vacuum, the residue diluted with ethyl acetate and the organic phase shaken with a 5% acetic acid. The acid, aqueous solution is made alkaline with $NaHCO_3$ and extracted with ethyl acetate, the solution dried over sodium sulfate and evaporated. By chromatographing the evaporation residue on aluminium oxide and crystallization from aqueous acetone (+)-9,10-dihydroergotamine results in the form of prisms having a melting point of 239–240°, $[\alpha]_D^{20}=-63°$ (c.=0.2 in pyridine).

*Example 3.—A stereoisomer alkaloid of (+)-9,10-dihydroergotamine*

10 g. of (+)-9,10-dihydrolysergic acid chloride hydrochloride are dissolved in 150 cc. of pyridine at —30° and 8 g. of 2-amino-2-methyl-5-benzyl-10b-hydroxy-3,6-dioxo-octahydro - oxazolo[3,2-a]pyrrolo[2,1-c]pyrazine hydrochloride (isomer B) are added. The mixture is slowly heated to room temperature and then stirred for a further hour. The solvent is evaporated in a vacuum and the residue divided between methyl chloride and a sodium bicarbonate solution. The evaporation residue of the organic phase is purified by chromatography on aluminium oxide using chloroform containing increasing quantities of alcohol. A fraction which crystallizes from acetone in the shape of colourless needles having a melting point of 190–198° is eluted with $CHCl_3$ containing 1% of alcohol. $[\alpha]_D^{20}=-51°$ (c.=1 in pyridine). This base having an empirical formula of $C_{35}H_{37}O_5N_5$ is a stereoisomer of (+)-9,10-dihydroergotamine.

*Example 4.—Ergostin and ergostinin*

(a) *2(2 - benzyloxy - 2 - ethyl - O - ethyl - malonyl)-3 - benzyl - 1,4 - diketo - octahydro - pyrrolo[1,2 - a]pyrazine.*—A solution of 92.5 g. of 3 - benzyl - 1,4 - diketo-octahydro - pyrrolo[1,2 - a]pyrazine (produced from L-phenylalanine and L-proline) in 580 cc. of absolute pyridine is cooled to —30° and 95.5 g. of 2-benzyloxy-2-ethyl-malonic acid chloride monoethylester are added dropwise whilst stirring. The reaction is left to stand for 15 hours at 0° and 100 cc. of water are added, the mixture is stirred for a further half hour at 0° and then poured onto ice, made acid and extracted a number of times with ethylene chloride. The organic extracts are washed consecutively with a 2 N hydrochloric acid, water and a concentrated sodium bicarbonate solution, dried with sodium sulfate and the solvent removed in a vacuum. The residue is taken up in ether, the ethereal solution washed well a number of times with water, dried again and evaporated in a vacuum, the 2 - (2 - benzyloxy - 2 - ethyl - O - ethylmalonyl) - 3 - benzyl - 1,4 - diketo - octahydro - pyrrolo [1,2-a]pyrazine resulting as a light yellow oil. This is a diastereoisomer mixture of the D,L,L- and L,L,L-compound as the optically active 3 - benyl - 1,4 - diketo - octahydro - pyrrolo[1,2 - a]pyrazine was converted with D,L-2 - benzyloxy - 2 - ethyl - malonic acid chloride monoethylester. The two isomers may be separated by chromatography on silica gel with a mixture of chloroform containing 0.5% of methanol. However, it is advantageous to convert the mixture further as the two isomer cycloesters of the following stage may be separated by crystallization The 2 - benzyloxy - 2 - ethyl - malonic acid chloride monoethylester used as starting material may be prepared from 2 - bromo - 2 - ethyl - malonic acid diethylester in a manner analogous to that of Example 1(a) and (b). Boiling point 148–150° at 0.01 mm. of Hg. $n_D^{20}$=1.5010. 2-benzyloxy - 2 - ethyl - malonic acid diethylester: boiling point 130–135° at 0.01 mm. of Hg.

(b) 2 - ethoxycarbonyl - 2 - ethyl - 5 - benzyl - 10b-hydroxy - 3,6 - dioxo - octahydro - oxazolo[3,2 - a]pyrrolo [2,1 - c]pyrazine.—A solution of 146 g. of 2 - (2 - benzyloxy - 2 - ethyl - O - ethyl - malonyl) - 3 - benzyl - 1,4-diketo - octahydro - pyrrolo[1,2-a]pyrazine in 500 cc. of glacial acetic acid is added to a suspension of 145 g. of pre-hydrogenated palladium (5%) on aluminium oxide in 500 cc. of glacial acetic acid. By shaking over night in an atmosphere of hydrogen approximately 10 litres of hydrogen are taken up. The catalyst is then filtered off and the solution evaporated in a vacuum. The oily residue is taken up in ethylene chloride, the solution washed a number of times with water and dried over sodium sulfate. After evaporation of the solvent a colourless oil results from which the 2 - ethoxycarbonyl - 2 - ethyl - 5-benzyl - 10b - hydroxy - 3,6 - dioxo - octahydro - oxazolo [3,2 - a]pyrrolo[2,1 - c]pyrazine, isomer B, crystallizes upon the addition of a little ethyl acetate. Melting point 186–187°, $[\alpha]_D^{20}$=−54° (c.=0.5 in pyridine). The mother liquor is again evaporated so that an oil forms and is recrystallized from a little ethyl acetate. Isomer A, melting point 163–165°, $[\alpha]_D^{20}$=−10° (c.=0.5 in pyridine).

(c) 2 - carboxy - 2 - ethyl - 5 - benzyl - 10b - hydroxy-3,6 - dioxo - octahydro - oxazolo[3,2 - a]pyrrolo[2,1 - c] pyrazine.—65 cc. of a 1 N sodium hydroxide solution are added to 10 g. of 2 - ethoxycarbonyl - 2 - ethyl - 5 - benzyl-10b - hydroxy - 3,6 - dioxo - octahydro - oxazolo[3,2 - a] pyrrolo[2,1 - c]pyrazine. The clear solution is left to stand at room temperature for two hours and 65 cc. of a 1 N hydrochloric acid are added whilst cooling with ice and the mixture left to crystallize at 0°. 2 - carboxy-2 - ethyl - 5 - benzyl - 10b - hydroxy - 3,6 - dioxo - octahydro - oxazolo[3,2 - a]pyrrolo[2,1 - c]pyrazine results. Isomer A: melting point 137–139°, $[\alpha]_D^{20}$=−4° (c.=0.6 in pyridine). Isomer B: melting point 208–210° (decomposition), $[\alpha]_D^{20}$=−47° (c.=0.5 in pyridine).

(d) 2 - chlorocarbonyl - 2 - ethyl - 5 - benzyl - 10b-hydroxy - 3,6 - dioxo - octahydro - oxazolo[3,2 - a]pyrrolo[2,1 - c]pyrazine.—1.115 g. of sodium and then 17.4 g. of 2 - carboxy - 2 - ethyl - 5 - benzyl - 10b - hydroxy-3,6 - dioxo - octahydro - oxazolo[3,2 - a]pyrrolo[2,1 - c] pyrazine are dissolved in 224 cc. of absolute methanol whilst cooling with ice until the solution is clear and the solution is then evaporated to dryness in a vacuum. The residue is dried in a high vacuum or 1 hour at 100° and suspended in 150 cc. of oxalyl chloride whilst cooling with ice and the dispersion then stirred well at 0° for half an hour and at room temperature for 1 hour. The excess oxalyl chloride is then distilled off in a vacuum, the residue taken up in absolute methylene chloride, the solution filtered, again evaporated to dryness and the resulting 2- chlorocarbonyl - 2 - ethyl - 5 - benzyl - 10b - hydroxy-3,6 - dioxo - octahydro - oxazolo[3,2 - a]pyrrolo[2,1 - c] pyrazine recrystallized from ether. Isomer A: melting point 117–118°, $[\alpha]_D^{20}$=+40° (c.=0.75 in CHCl$_3$). Isomer B: melting point 157°, $[\alpha]_D^{20}$=+20° (c.=0.5 in CHCl$_3$).

(e) 2 - azidocarbonyl - 2 - ethyl - 5 - benzyl - 10b - hydroxy - 3,6 - dioxo - octahydro - oxazolo[3,2 - a]pyrrolo [2,1 - c]pyrazine.—12 g. of 2 - chlorocarbonyl - 2 - ethyl-5 - benzyl - 10b - hydroxy - 3,6 - dioxo - octahydro - oxazolo[3,2 - a]pyrrolo[2,1 - c]pyrazine. are dissolved in 500 cc. of acetone and a solution of 2.58 g. of sodium azide in 8 cc. of water is added dropwise whilst stirring. The reaction mixture is then stirred vigorously for 1 hour, the solution evaporated in a vacuum, the residue stirred into 1000 cc. of water and the aqueous solution extracted with methylene chloride. After evaporation of the solvent the 2 - azidocarbonyl - 2 - ethyl - 5 - benzyl - 10b - hydroxy - 3,6 - dioxo - octahydro - oxazolo[3,2 - a]pyrrolo [2,1 - c]pyrazine results. Isomer A: melting point approximately 160° (decomposition). Isomer B: melting point approximately 118–120° (decomposition), $[\alpha]_D^{20}$=+23°

(c.=0.9 in CHCl$_3$).

(f) 2 - benzyloxycarbonyl - amino - 2 - ethyl - 5 - benzyl - 10b - hydroxy - 3,6 - dioxo - octahydro - oxazolo[3,2-a]pyrrolo[2,1-c]pyrazine.—872 mg. of 2 - azidocarbonyl-2 - ethyl - 5 - benzyl - 10b - hydroxy - 3,6 - dioxo - octahydro - oxazolo[3,2 - a]pyrrolo[2,1 - c]pyrazine in 5 cc. of absolute benzyl alcohol are heated for 5 minutes to 130° accompanied by a strong evolution of nitrogen. The excess benzyl alcohol is subsequently evaporated in a high vacuum and the residue recrystallized from ether. Isomer A: melting point 198–200°, $[\alpha]_D^{20}$=+16° (c.=0.3 in pyridine). Isomer B: melting point 210–212°, $[\alpha]_D^{20}$=−52°

(c.=0.6 in pyridine).

(g) 2 - amino - 2-ethyl-5-benzyl-10b-hydroxy-3,6-dioxo-octahydro - oxazolo[3,2-a]pyrrolo[2,1-c]pyrazine chlorohydrate.—A solution of 11 g. of 2-benzyloxycarbonyl-2-ethyl - 5-benzyl-10b-hydroxy-3,6-dioxo-octahydro-oxazolo [3,2-a]pyrrolo[2,1-c]pyrazine in 200 cc. of a mixture of equal parts of methanol and methylene chloride containing 8 cc. of a methanolic hydrochloric acid (360 mg. HCl per cc.) is added to a suspension of 24 g. of 5% pre-hydrogenated palladium on aluminium oxide in 96 cc. of absolute methanol containing 40 cc. of methylene chloride. The reaction mixture is shaken for 45 minutes at room temperature in an atmosphere of hydrogen. 540 cc. of hydrogen being used. The catalyst is filtered off from the resulting colourless solution, the mixture evaporated in a vacuum and the residue taken up in ether, the chlorohydrate of the amine precipitating as an amorphous powder. The latter is washed three times with absolute ether and then dried over phosphorus pentoxide. The hydrochloride of the 2-amino-2-ethyl-5-benzyl-10b-hydroxy - 3,6 - dioxo-octahydro-oxazolo[3,2-a]pyrrolo [2,1-c]pyrazine chlorohydrate results.

(h) Ergostine and ergostinine.—1 g. of 2-amino-2-ethyl - 10b - hydroxy-5-benzyl-3,6-dioxo-octahydro-oxazolo [3,2-a]pyrazine-hydrochloride (isomer A) and 1 g. of lysergic acid chloride hydrochloride are suspended in 50 cc. of a mixture of chloroform and tertiary butanol (3:1) and a solution of 11 cc. of pyridine added dropwise thereto whilst cooling, the mixture stirred for half an hour, the cooling bath removed and the mixture stirred for a further 1½ hours at room temperature. The dark brown solution is diluted with 40 cc. of a saturated soda solution and 40 cc. of chloroform and stirred for ¼ hour. For the purpose of working up the solution it is further diluted with 60 cc. of chloroform and 40 cc. of water, shaken well and the two phases separated. The aqueous phase is extracted a further four times with chloroform and the chloroform solutions washed once with water, dried with sodium sulfate and the solvent removed. Benzene is added to the brown crude product which still contains some pyridine, the benzene is then sucked off and the residue subsequently dried in a high vacuum. This crude product is then chromatographed on a 35-fold quantity of silica gel Merck.

The ergostinine is washed into the filtrate by means of a mixture of methylene chloride containing 0.5–1% of methanol. The combined eluates are evaporated and the residue recrystallized from acetone: colourless needles, melting point 215–216° (decomposition). $[\alpha]_D^{20}=+430°$ (c.=1.15 in pyridine). $[\alpha]_D^{20}=+367°$ (c.=1.0 in $CHCl_3$). Keller's colour reaction: blue turning green after 2–3 minutes.

The ergostine is eluted from the column with methylene chloride containing 2% of methanol and is then recrystallized from aqueous acetone for the purpose of further purification. Well defined prisms having a melting point of 211–212° (decomposition) result. $[\alpha]_D^{20}=-35°$ (c.=0.7 in pyridine). $[\alpha]_D^{20}=-168°$ (c.=1.6 in $CHCl_3$). Keller's colour reaction: blue, turning green after 15–20 seconds. Neutral tartrate: melting point 188–191° (decomposition). Acid maleate: melting point 191–192° (decomposition).

Example 5.—9,10-dihydroergostine 10 g. of 2-amino-2-ethyl-10b-hydroxy-5-benzyl-3,6-dioxo - octahydro-oxazolo[3,2 - a]pyrrolo[2,1-c]pyrazine chlorohydrate (isomer A) and 10 g. of 9,10-dihydrolysergic acid chloride hydrochloride are suspended in 300 cc. of methylene chloride and a solution of 16 g. of pyridine in 300 cc. of methylene chloride are added thereto at 0° whilst stirring vigorously. After stirring for 15 minutes at room temperature the solvent is evaporated in a vacuum, the residue taken up in ethyl acetate and shaken with a 2% aqueous tartaric acid solution. The acid aqueous extract is made alkaline with sodium bicarbonate and shaken with ethyl acetate. The ethyl acetate extract is evaporated after being dried with sodium sulfate and the residue taken up in 300 cc. of hot acetone. 9,10-dihydroergostine crystallizes from this solvent in the form of needles which are recrystallized from a 40-fold quantity of hot methanol for the purpose of purification. Melting point 224–226° (decomposition). $[\alpha]_D^{20}=-59°$ (c.=1.8 in pyridine). $[\alpha]_D^{20}=-30°$ (c.=0.8 in chloroform). Keller's colour reaction: violet blue, stable. Neutral tartrate: crystallizes from methanol upon dilution with water in the form of massive prisms having a melting point of 201–203° (decomposition). Acid maleate: crystallizes from methanol in prisms having a melting point of 203–205° (decomposition).

Example 6.—Ergosine and ergosinine (a) *N-carbobenzoxy-L-prolyl-L-leucine methylester.*— A solution of 45 g. (0.22 mol) of dicyclohexyl-carbodiimide in 50 ml. of absolute ether is added dropwise to a solution of 29 g. (0.2 mol) of L-leucine methylester and 50 g. (0.2 mol) of N-carbobenzoxy-L-proline in 50 ml. of methylene chloride and 100 ml. of absolute ether whilst stirring at 20°. Subsequently the reaction mixture is heated to the boil at reflux for one hour. The excess dicyclohexylcarbodiimide is decomposed with 2 ml. of glacial acetic acid and the separated dicyclohexyl urea filtered off. The filtrate is first washed with a $NaHCO_3$ solution and then with water, dried with $Na_2SO_4$ and the solvent removed. The crude product which results is crystallized from benzene/heptane and yields N-carbobenzoxy-L-prolyl-L-leucine methylester in the form of colourless pointed rodlets having a melting point of 76–77°.

(b) *3-isobutyl-1,4-dioxo-octahydro-pyrrolo[1,2-a]pyrazine.*—69 g. (0.183 mol) of N-carbobenzoxy-L-prolyl-L-leucine methylester are hydrogenated in 750 ml. of absolute methanol with 25 g. of prehydrogenated palladium catalyst on aluminium oxide (5% Pd) at room temperature and normal pressure. After three hours the taking up of hydrogen is completed, the catalyst filtered off and the solvent removed in a vacuum. 41.8 g. of oily L-prolyl-L-leucine-methylester result and this is cyclized in a vacuum at 120° during the course of 2½ hours to yield 3-isobutyl-1,4-dioxo-octahydro-pyrrolo[1,2-a]pyrazine. The crude product is crystallized by heating and then purified by recrystallization from ethyl acetate to yield 3-isobutyl-1,4-dioxo-octahydro-pyrrolo[1,2-a]pyrazine having a melting point of 163–165°. $[\alpha]_D^{20}=-144°$ (c.=0.5 in water).

(c) *2-(2-benzyloxy-2-methyl-O-ethyl-malonyl)-1,4-diketo - 3-isobutyl-octahydro-pyrrolo[1,2-a]pyrazine.*—10.5 g. (50 millimol) of 3-isobutyl-1,4-dioxo-octahydro-pyrrolo[1,2-a]pyrazine are suspended in 6 ml. of absolute dioxane, 3.95 g. (50 millimol) of absolute pyridine are first added and then 13.5 g. (50 millimol) of 2-methyl-2-benzyloxy-malonic acid semiester chloride. The mixture is then heated to 70° for 1½ hours whilst stirring. After cooling, the reaction mixture is diluted with ether and ice cold 2 N HCl, is then extracted with ice water in a $NaHCO_3$ solution and again with ice water. The ethereal solutions are dried thoroughly with $Na_2SO_4$ and the solvent carefully removed. 20.5 g. of a honey-like, unstable crude product, which eventually crystallizes, results as a residue. Melting point undefined at approximately 80°.

(d) *2 - ethoxycarbonyl-2-methyl-10b-hydroxy-5-isobutyl-3,6 - dioxo-octahydro-oxazolo[3,2-a]pyrrolo[2,1-c]pyrazine.*—20.5 g. of crude 2-(2-benzyloxy-2-methyl-O-ethyl-malonyl) - 1,4 - diketo-3-isobutyl-octahydro-pyrrolo[1,2-a]pyrazine are hydrogenated in 250 ml. of fine spirit with 10 g. of palladium on activated charcoal (5% Pd) as catalyst at 20° and at normal pressure. After 20 hours the theoretical quantity of hydrogen is taken up whereupon the hydrogenation ceases. The catalyst is filtered off and the solvent removed in a vacuum. The 15.5 g. of oily residue crystallize upon standing. 2-ethoxycarbonyl-2-methyl - 10b - hydroxy-5-isobutyl-3,6-dioxo-octahydro-oxazolo [3,2-a]pyrrolo[2,1-c]pyrazine is recrystallized from isopropyl ether/heptane in the form of rodlike crystals having a melting point of 100–101°. $[\alpha]_D^{20}=-21°$ (c.=1 in ethanol).

(e) *2 - carboxy-2-methyl-10b-hydroxy-5-isobutyl - 3,6-dioxo-octahydro-oxazolo[3,2-a]pyrrolo[2,1-c]pyrazine.*— 15.3 g. of crude 2-ethoxycarbonyl-2-methyl-10b-hydroxy-5 - isobutyl-3,6-dioxo-octahydro-oxazolo[3,2-a]pyrrolo[2, 1-c]pyrazine are dissolved in 10 ml. of methyl alcohol and 100 ml. of 1 N NaOH solution added whilst cooling. The mixture is left to stand for 2½ hours at 20° and is then extracted twice with ether so as to remove the non-saponified components, the aqueous-methanolic solution is then filtered through active charcoal and the filtrate acidified with 60 ml. of 2 N HCl. The resulting crystalline 2-carboxy-2-methyl-10b-hydroxy-5-isobutyl-3,6 - dioxo-octahydro-oxazolo[3,2-a]pyrrolo[2,1-c]pyrazine is recrystallized a number of times from methanol yielding colourless needles having a melting point of 192–193°. $[\alpha]_D^{20}=-25.5°$ (c.=1 in pyridine).

(f) *2 - chlorocarbonyl-2-methyl-10b-hydroxy-5-isobutyl - 3,6 - dioxo-octahydro - oxazolo[3,2-a]pyrrolo[2,1-c] pyrazine.*—9.8 g. (30 millimole) of finely pulverized 2-carboxy-2-methyl-10b-hydroxy-5-isobutyl-3,6 - dioxo-octahydro-oxazolo[3,2-a]pyrrolo[2,1-c]pyrazine dried in a high vacuum and 18.7 g. of freshly sublimated finely pulverized phosphorus pentachloride are suspended in 200 ml of absolute ether and stirred well for 2 hours. The precipitate is filtered off with suction, the filter residue washed well with absolute ether and dried in a high vacuum. 2-chlorocarbonyl-2-methyl-10b-hydroxy - 5 - isobutyl-3,6-dioxo-octahydro-oxazolo[3,2-a]pyrrolo[2,1-c]pyrazine having a melting point of 146–147° results.

(g) *2 - azidocarbonyl - 2-methyl-10b-hydroxy-5-isobutyl - 3,6 - dioxo-octahydro-oxazolo[3,2-a]pyrrolo[2,1-c] pyrazine.*—A concentrated aqueous solution of 2.65 g. of sodium azide is added dropwise to a solution of 9.3 g. of crude 2-chlorocarbonyl-2-methyl-10b-hydroxy-5-isobutyl-3,6 - dioxo-octahydro-oxazolo[3,2-a]pyrrolo[2,1-c] pyrazine in 150 ml. of acetone at room temperature. The mixture is then stirred for 2 hours at 20° and the major portion of the acetone removed in a vacuum without heating. The residue is shaken between methylene chloride and sodium bicarbonate solution. The methylene chloride is removed in a vacuum at 20° and the crude azide suspended in ether, the ether filtered off and the residue, the crude 2 - azidocarbonyl-2-methyl-10b-hydroxy-5-isobutyl - 3,6-dioxo-octahydro-oxazolo[3,2-a]pyrrolo[2,1-c]pyrazine is immediately processed further after carefully drying in a high vacuum at 20°, without further purification.

(h) *2 - benzyloxycarbonyl-2-methyl-10b-hydroxy-5-isobutyl - 3,6 - dioxo-octahydro-oxazolo[3,2-a]pyrrolo[2,1-c]pyrazine.*—4.5 g. of crude 2-azidocarbonyl-2-methyl-10b-hydroxy-5-isobutyl - 3,6 - dioxo-octahydro-oxazolo[3,2-a]pyrrolo[2,1-c]pyrazine and 2.76 g. of absolute benzyl alcohol are heated to boil at reflux in 30 ml. of absolute chloroform for 1½ hours, the volatile components of the reaction mixture removed in a vacuum and the residue recrystallized from methylene chloride/ethyl acetate, yielding crystalline 2-benzyloxycarbonyl-amino-2-methyl-10b-hydroxy - 5 - isobutyl-3,6-dioxo - octahydro-oxazolo [3,2-a]pyrrolo[2,1-c]pyrazine in the form of rodlets having a melting point of 212–213° (decomposition). $[\alpha]_D^{20} = +19.1°$ (c.=2 in ethanol).

(i) *2 - amino - 2 - methyl-10b-hydroxy-5-isobutyl-3,6-dioxo-octahydro-oxazolo [3,2-a] pyrrolo [2,1-c] pyrazine chlorohydrate.*—1.0 g. (2.3 millimol) of 2-benzyloxycarbonyl-amino-2-methyl-10b - hydroxy-5-isobutyl-3,6-dioxo-octahydro-oxazolo[3,2-a]pyrrolo[2,1-c]pyrazine in 75 ml. of methanol containing 7.4 millimol of gaseous HCl, is hydrogenated with 2 g. of prehydrogenated palladium catalyst on activated charcoal (5% Pd). 22 ml. of hydrogen are taken up within 2 minutes whereupon the hydrogenation ceases. The mixture is stirred for a further 15 minutes to make sure that no further hydrogen is taken up. The catalyst is then filtered off and the filtrate concentrated to approx. 30 ml. at 20°, whereupon scratching with a glass rod causes crystallization to commence. So as to obtain the maximum yield of hydrochloride the mixture is diluted with absolute ether to a volume of approx. 200 ml. After filtering off the crystals and drying in a high vacuum the 2-amino-2-methyl-10b-hydroxy-5-isobutyl-3,6-dioxo-octahydro-oxazolo[3,2-a]pyrrolo[2,1-c]pyrazine chlorohydrate results in the form of microscopically small rodlets pointed at both ends and having a melting point of 192–193° (decomposition).

(j) *Ergosine and ergosinine.*—0.5 g. (1.5 millimol) of 2 - amino-2-methyl-10b-hydroxy-5-isobutyl-3,6-dioxo-octahydro - oxazolo[3,2-a]pyrrolo[2,1-c]pyrazine chlorohydrate and 1.0 g. of lysergic acid chloride hydrochloride (3.1 millimol) are suspended in 10 ml. of absolute methylene chloride and cooled to 0°. 5.5 ml. of absolute pyridine are added at once to this suspension and the reaction mixture stirred for a further ½ hour at 0°. The ice bath is then removed and the mixture heated to room temperature and stirred for a further 1½ hours at 20°. 20 ml. of a saturated soda solution and 20 ml. of chloroform are added to the dark brown solution and the mixture is stirred for a further 15 minutes. The mixture is then diluted with 30 ml. of chloroform and 20 ml. of water and the two phases separated from each other by means of a separating funnel. The aqueous solution is subsequently extracted a further three times with chloroform, the chloroform solutions boiled once with water, dried well and the solvent removed. After removal of the pyridine in a high vacuum 1.0 g. of a dark resin results, this is dissolved in methanol, filtered through active charcoal and evaporated once more. The remaining residue is chromatographed on 30 g. of dry silica gel Merck. A solution of methylene chloride containing 0.7 to 1% of methanol is used for the elution. After crystallizing the eluate twice from methanol, pure ergosinine results in the form of colourless needles having a melting point of 190–191° (decomposition). Upon admixture with natural ergosinine no depression of melting point was observed. $[\alpha]_D^{20} = +390°$ (c.=0.5 in chloroform). The synthetic product and the natural ergosinine behaved identically when tested with thin layer chromatography both on aluminium oxide and silica gel plates in various solvent systems. The IR spectra, taken in Mujol suspension and in a methylene chloride solution, again showed the two compounds to be identical. UV spectra: $\lambda_{max}$. 242 mµ (log ε 4.23) and 309 mµ (log ε 3.93). Minimum at 269.5 mµ.

After eluting some mixed fractions of ergosinine and ergosine with methylene chloride containing 1.5% of methanol, practically pure ergosine is eluted with methylene chloride containing 2% of methanol. By recrystallizing twice from methyl acetate, colourless rectangular plates having a melting point of 224–225° (decomposition) result. The crystals have the same shape as natural ergosine and admixture with authentic ergosine caused no depression of the melting point. $[\alpha]_D^{20} = -155°$ (c.=0.45 in chloroform). The synthetic product and the natural ergosine behaved identically in thin layer chromatography both on silica gel and aluminium oxide plates. UV spectra: $\lambda_{max}$. 239.5 mµ (log ε 4.33) and 312 mµ (log ε 3.97). Minimum at 234 and 269.5 mµ. The IR spectra which were taken in methylene chloride and in Nujol, and the NMR spectra, taken in CHCl$_3$, were also identical for the two compounds.

*L-di-para-tolyl-tartrate of synthetic ergosine.*—Microscopically small, rectangular crystals having a melting point of 199–200°; a mixture of the synthetic and the authentic compound has a melting point of 199–200°. $[\alpha]_D^{20} = -62°$ (c.=0.5 ethanol).

*Example 7.—Ergovaline, ergovalinine and 9,10-dihydro-ergovaline*

(a) *N-benzyloxycarbonyl-L-prolyl-L-valine methyl ester.*—98.4 g. (0.75 mol) of L-valine methyl ester (boiling point 60°/11 mm. of Hg) and 187.5 g. (0.75 mol) of N-benzyloxycarbonyl-L-proline are dissolved in 750 ml. of absolute ether and 171.0 g. (0.83 mol) of N,N'-dicyclohexyl-carbodiimide in 250 ml. of absolute ether are added dropwise whilst stirring well during the course of half an hour, whereby the temperature slowlyrises to 35° and a precipitate of N,N'-dicyclohexyl-urea results. Heating to the boil is subsequently effected for one hour, the reaction mixture is then cooled and precipitated N,N'-dicyclohexyl-urea is filtered off. In order to remove unreacted starting materials the filtrate which has been diluted with ether is first washed twice with a N sodium bicarbonate solution, each time with 500 ml. then twice with the same amount of a N hydrochloric acid and finally with water until neutral. After subsequently extracting the aqueous phases twice, each time with 1 litre of ether, the ethereal solutions are dried and the solvent is evaporated, whereby a colourless, viscous oil, $n_D^{20} = 1.5115$, results, which is further worked up without additional purification, as the N-benzyloxycarbonyl-L-prolyl-L-valine methyl ester cannot be crystallized.

(b) *1,4-dioxo-3-isopropyl - octahydro - pyrrolo[1,2-a] pyrazine.*—25.5 g. (0.070 mol) of crude N-benzyloxy-carbonyl-L-prolyl-L-valine methyl ester are hydrogenated with 10 g. of a palladium/charcoal catalyst (5% of palladium) in 150 ml. of ethyl acetate and 100 ml. of glacial acetic acid. After the taking up of hydrogen diminishes the hydrogenating flask is evacuated and hydrogenation is continued, whereby hydrogen is again taken up. A total of 1360 ml. of hydrogen is taken up. When hydrogen is no longer taken up, the catalyst is filtered off, the solvent is removed and the oily residue is heated in a high vacuum for 4 hours to 120–130°, whereby crystallization occurs after approximately one hour. After recrystallization from ethyl acetate pure 1,4 - dioxo - 3 - isopropyl - octahydro-pyrrolo[1,2-a]pyrazine, having a melting point of 190–192°, is obtained in the form of colourless needles, $[\alpha]_D^{20}= -159°$ (c.=0.7 in ethanol).

(c) *2-(2 - benzyloxy-2-methyl-O-ethyl-malonyl) - 1,4-dioxo-3-isopropyl - octahydro - pyrrolo[1,2-a]pyrazine.*—58.8 g. (0.3 mol) of 1,4-dioxo-3-isopropyl-octahydro-pyrrolo[1,2-a]pyrazine are suspended in 40 ml. of absolute dioxane and 23.7 g. (0.3 mol) of absolute pyridine are added thereto. 81 g. (0.3 mol) of methyl-benzyloxy-malonic acid semi-ester chloride are added dropwise to the mixture at +10° during the course of 10 minutes and heating is subsequently effected to 70° for 1½ hours whilst stirring. After cooling the reaction mixture is poured on ice, an excess of a 2 N hydrochloric acid is added and extraction is effected three times with ether. The ethereal solutions are first washed with a sodium bicarbonate solution and then with water. After drying the ether solution with sodium sulphate and removing the solvent a crystaline crude product is obtained which is recrystallized from ether and yields 2-(2-benzyloxy-2-methyl-O-ethyl-malonyl)-1,4-dioxo-3-isopropyl - octahydro-pyrrolo[1,2-a]pyrazine having a melting point of 110–111°. Further portions of acylation product, having a melting point of 104–105°, may be obtained from the mother liquors by repeated crystallization. $[\alpha]_D^{20}= +138°$ (in ethanol).

(d) *2-ethoxycarbonyl-2-methyl-5-isopropyl - 10b - hydroxy-3,6-dioxo-octahydro-oxazolo[3,2-a]pyrrolo[1,2 - c]pyrazine.*—20 g.(46.5 millimols) of 2-(2-benzyloxy-2-methyl-O-ethyl-malonyl)-1,4-dioxo - 3 - isopropyl - octahydro-pyrrolo[1,2-a]pyrazine are hydrogenated at 20° and normal pressure in 200 ml. of absolute ethyl acetate and 20 g. of prehydrogenated palladium on active charcoal (5% of palladium) as catalyst. After the theoretical amount of hydrogen has been taken up (approximately 15 hours) hydrogenation stops. The catalyst is then filtered off, the residue is washed well with ethyl acetate and the solvent is removed in a vacuum. After repeated recrystallization from isopropyl ether pure 2-ethoxy-carbonyl-2-methyl-5-isopropyl-10b - hydroxy-3,6 - dioxo-octahydro-oxazolo[3,2-a]pyrrolo[2,1,-c]pyrazine, having a melting point of 104–105°, is obtained. $[\alpha]_D^{20}= -7°$ (c.=2 in ethanol). Ultraviolet spectrum $\lambda_{max.}=200.5$ m$\mu$ (log $\epsilon$=4.17 in ethanol).

(e) *2-carboxy-2 - methyl-5-isopropyl-10b-hydroxy-10b-hydroxy-3,6-dioxo - octahydro - oxazolo[3,2 - a]pyrrolo-[2,1-c]pyrazine.*—52.5 g. (0.154 mol) of finely pulverized 2-ethoxycarbonyl-2-methyl-5-isopropyl-10b-hydroxy-3,6-dioxo-octahydro-oxazolo[3,2-a]pyrrolo[2,1 - c]pyrazine are dissolved at room temperature in 230 ml. of a N sodium hydroxide and left to stand for 2 hours. In order to liberate the 2-carboxy - 2 - methyl-5-isopropyl-10b-hydroxy-3,6-dioxo-octahydro-oxazolo[3,2 - a]pyrrolo[2,1-c]pyrazine which results, acidification is effected with 60 ml. of a 4 N hydrochloric acid, whereby the acid, which is already almost analytically pure, crystallizes out. After filtration the residue is recrystallized once more from methano/water: colourless needles having a melting point of 187–188°, $[\alpha]_D^{20}= -16.5°$ (c.=2.2 in pyridine). Ultraviolet spectrum: $\lambda_{max.}=201$ m$\mu$ (log $\epsilon$=4.16 in ethanol).

(f) *2 - chlorocarbonyl - 2 - methyl-5-isopropyl-10b-hydroxy - 3,6 - dioxo - octahydro - oxazolo[3,2-a]pyrrolo[2,1-c]pyrazine.*—15.6 g. (50 millimols) of finely pulverized 2 - carboxy - 2 - methyl - 5 - isopropyl - 10b - hydroxy-3,6-dioxo - octahydro - oxazolo[3,2-a]pyrrolo[2,1-c]pyrazine are suspended in 250 ml. of absolute ether and a total of 20.8 g. of freshly sublimated phosphorus pentachloride is added portionwise to the suspension. The reaction mixture is subsequently stirred at room temperature for 1½ hours and the precipitated residue of the acid chloride is filtered off from the ether solution, is washed well with absolute ether and dried at 20° in a high vacuum: 2-chlorocarbonyl-2-methyl - 5 - isopropyl - 10b - hydroxy-3,6-dioxo - octahydro - oxazolo[3,2-a] pyrrolo[2,1-c]pyrazine, melting point 133–134° (decomposition), $[\alpha]_D^{20}=+18°$ (c.=1 in CHCl$_3$).

(g) *2 - azidocarbonyl - 2 - methyl-5-isopropyl-10b-hydroxy - 3,6 - dioxo - octahydro - oxazolo[3,2-a]pyrrolo[2, 1-c]pyrazine.*—18.7 g. (56.5 millimols) of 2-chlorocarbonyl-2-methyl - 5 - isopropyl - 10b - hydroxy-3,6-dioxo-octahydro-oxazolo[3,2-a]pyrrolo[2,1-c]pyrazine are dissolved at room temperature in absolute acetone which is free of methanol and 7.3 g. of sodium azide in 18 ml. of water are added to the solution, whereby a portion of the sodium azide crystallizes out again on combining the two solutions. The suspension is stirred at 20° for half an hour and is subsequently concentrated almost to dryness at 20° in a rotatory evaporator. The residue is shaken out between an ice cold sodium bicarbonate solution and methylene chloride and the bircarbonate solution is extracted; a further twice with methylene chloride. The methylene chloride solution of 2-azido-carbonyl-2-methyl-5-isopropyl - 10b - hydroxy - 3,6 - dioxo-octahydro-oxazolo[3,2-a]pyrrolo[2,1-c]pyrazine is washed once with ice water, dried well and the solvent is removed in a vacuum at 20° as the azide is liable to decompose. Crystalline 2 - azidocarbonyl-2-methyl-5-isopropyl-10b-hydroxy-3,6 - dioxo - octahydro-oxazolo[3,2-a]pyrrolo[2,1-c]pyrazine is obtained by recrystallization from methylene chloride/petroleum ether. Fine, cotton wool like needles having a melting point of 98° (decomposition), $[\alpha]_D^{20}=-22°$ (c.=1 in CHCl$_3$). Infrared spectrum: most important bands at 3480–3400 (broad) 2250, 2190, 2145, 1721, 1686 and 1650 cm.$^{-1}$ (in methylene chloride).

(h) *2 - N-benzyloxycarbonyl-amino-2-methyl-5-isopropyl - 10b - hydroxy - 3,6 - dioxo-octahydro-oxazolo[3,2-a]pyrrolo[2,1-c]pyrazine.*—6.5 g. (19.2 millimols) of 2-azidocarbonyl - 2 - methyl - 5 - isopropyl - 10b - hydroxy-3,6-dioxo - octahydro - oxazolo[3,2-a]pyrrolo[2,1-c]pyrazine and 6.5 ml. of absolute benzyl alcohol are heated to the boil at reflux in 40 ml. of absolute chloroform for one hour. The reaction mixture is then freed from the readily volatile components and subsequently the major portion of the excess benzyl alcohol is removed in a high vacuum. After recrystallization from ethyl acetate the residue yields 2 - N-benzyloxycarbonyl-amino-2-methyl-5-isopropyl-10b-hydroxy-3,6-dioxo-octahydro - oxazolo[3,2-a]pyrrolo[2,1-c]pyrazine having a melting point of 187–188°. For purposes of analysis a sample of the compound is repeatedly recrystallized from ethyl acetate, whereby the melting point reaches 190–191°. Colourless prisms, $[\alpha]_D^{20}=+13°$ (c.=2 in ethanol).

(i) *2-amino-2-methyl-5-isopropyl - 10b - hydroxy-3,6-dioxo - octahydro - oxazolo[3,2-a]pyrrolo[2,1-c]pyrazine hydrochloride.*—3.7 g. (8.86 millimols) of 2-N-benzyloxycarbonyl-amino-2-methyl-5-isopropyl - 10b - hydroxy-3,6 - dioxo - octahydro-oxazolo[3,2-a]pyrrolo[2,1-c]pyrazine are dissolved in 50 ml. of absolute methanol and the solution is added to a suspension of 5 g. of prehydrogenated palladium/active charcoal catalyst (5% of palladium) in 50 ml. of absolute methanol. Directly before hydrogenation 11 ml. of an 11% solution of hydrochloric acid in an absolute methanol are added to the mixture and hydrogenation is effected as rapidly as possible. After hydrogenation has been completed, the catalyst is filtered off, the filtrate is concentrated to approximately 20 ml. at approximately 20° and diluted with absolute ether, whereupon 2-amino-2-methyl-5-isopropyl-10b-hydroxy-3, 6 - dioxo - octahydro - oxazolo[3,2-a]pyrrolo[2,1-c]pyrazine hydrochloride crystallizes rapidly. Filtration is effected, the precipitate is washed well with absolute ether and dried at 20° in a high vacuum: colourless or slightly green coloured microcrystalline powder having a melting point of 163° (decomposition).

(j) *Ergovaline and ergovalinine.*—2.0 g. (6.25 millimols) of 2-amino-2-methyl-5-isopropyl-10b-hydroxy-3,6-dioxo - octahydro - oxazolo[3,2-a]pyrrolo[2,1-c]pyrazine hydrochloride and 5 g. (12.4 millimols) of d-lysergic acid chloride hydrochloride are suspended in 40 cc. of absolute methylene chloride, the mixture is cooled to 0° and 22 cc. of absolute pyridine are added in one bath at this temperature. The mixture is stirred for a further half hour at 0°, warmed to 20° and the reaction allowed to go to completion at this temperature while stirring for one hour. For the purposes of working up, the reaction mixture is diluted with methylene chloride and the methylene chloride solution is first extracted with a saturated sodium carbonate solution and then twice with water. The aqueous phases are shaken out a further twice with methylene chloride, the methylene chloride solutions which have been washed until neutral are combined, dried with $Na_2SO_4$ and the solvent is removed in a vacuum: the crude product results as a brown resin from which ergovalinine may be separated directly by recrystallization from methanol. After further recrystallization from methanol the ergovalinine is pure in the thin layer chromatogram. Colourless rectangular plates, melting point 221–222°, $[\alpha]_D^{20} = +419°$ (c.=0.3 in chloroform), $$[\alpha]_D^{20} = +438°$$

(c.=0.5 in pyridine), Keller's colour reaction blue, UV spectrum: $\lambda_{max.} = 239$ m$\mu$ (log $\epsilon$=4.32) and 311 m$\mu$ (log $\epsilon$=3.93). Minima at 230 and 268.5 m$\mu$.

The mother liquor remaining after crystallization is chromatographed on 95 g. of aluminium oxide (Merck). A further quantity of ergovalinine is eluted from the column with methylene chloride and 0.1% of methanol, followed by fractions which are a mixture of ergovaline and ergovalinine. Practically pure ergovaline can be eluted from the column with methylene chloride and 0.2 to 0.5% of methanol. After crystallization from ethyl acetate this compound is pure in the thin layer chromatogramm: practically colourless fine needles, melting point 177–178° (decomp.), $[\alpha]_D^{20} = -143°$ (c.=0.6 in chloroform), $[\alpha]_D^{20} = -15°$ (c.=0.6 in pyridine), UV spectrum: $\lambda_{max.} = 241$ m$\mu$ (log $\epsilon$=4.32) and 311.5 m$\mu$ (log $\epsilon$=3.97). Minima at 232 and 269.5 m$\mu$.

*Ergovaline sulphate.* — Fine cottonwool-like needles from methanol, melting point 205–206° (decomp.), $[\alpha]_D^{20} = +100.5°$ (c.=0.5 in water).

(k) *9,10-dihydro-ergovaline.*—320 mg. (1 millimol) of 2 - amino - 2 - methyl - 5 - isopropyl - 10b - hydroxy-3,6 - dioxo - octahydro - oxazolo[3,2 - a]pyrrolo[2,1-c]pyrazine hydrochloride and 980 mg. (3 millimols) of 9,10-dihydro-d-lysergic acid chloride hydrochloride are suspended in 50 cc. of absolute methylene chloride. 25 cc. of pyridine are added to this suspension at 0°, a dark solution resulting quickly. This solution is stirred for half an hour at 0° and subsequently for 1½ hours at room temperature. 200 cc. of a diluted sodium carbonate solution are added to the reaction solution and the mixture is extracted thrice with chloroform. The combined chloroform extracts are dried over sodium sulphate and the solvent is evaporated in a vacuum. So as to remove as much pyridine as possible the mixture is evaporated a further three times with benzene.

The purification of the crude product is best effected by chromatography on an aluminium oxide column. The crude product is dissolved in chloroform and adsorbed onto a 30-fold quantity of aluminium oxide (Merck activity 1). Elution with methylene chloride containing 1 to 2% of methanol, evaporation of the solvent and recrystallization of the residue from ethanol/ethyl acetate (1:1) results in 9,10-dihydro-ergovaline of melting point 221–222°, $[\alpha]_D^{20} = -5.8°$ (c.=1 in chloroform), Keller's colour reaction blue-violet, UV spectrum: $\lambda_{max.} = 223$ m$\mu$ (log $\epsilon$=4.51), 280 m$\mu$ (log $\epsilon$=3.84) and 291 m$\mu$ (log $\epsilon$=3.75). Minima at 244.5 and 288.5 m$\mu$.

What is claimed is:
1. The process for the production of lysergic acid amide compounds of the formula:

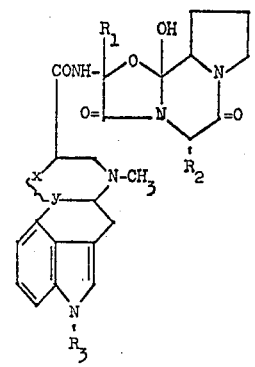

wherein $R_1$ and $R_3$ are each a member selected from the group consisting of hydrogen and alkyl containing from 1 to 5 carbon atoms, $R_2$ is a member selected from the group consisting of hydrogen, alkyl containing from 1 to 5 carbon atoms and benzyl, and $\overline{x\ y}$ is a member of the group consisting of

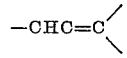

and

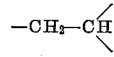

which process comprises reacting, at a temperature of about −30 to 0° C. in an inert organic solvent having a solvent action on the product of the reaction, a lysergic acid compound of the formula:

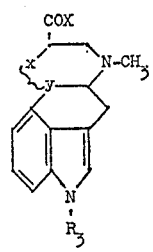

wherein $R_3$ and $\overline{x\ y}$ have the above significance and X is a member of the group consisting of chlorine, bromine and —$OSO_3H$, with an amine acid addition salt of an alpha hydroxy alpha amine compound which has an inherent tendency to rearrange in the form of the free amine base and is of the formula:

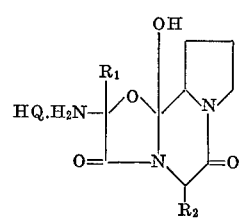

wherein $R_1$ and $R_2$ have the above significance, and Q is an anion of an acid selected from the group consisting of an inorganic acid and a strong organic acid, in the presence of a tertiary amine base.

2. The process as in claim 1 for the production of (+)- ergotamine wherein (+)-lysergic acid chloride hydrochloride is reacted with a salt of the formula:

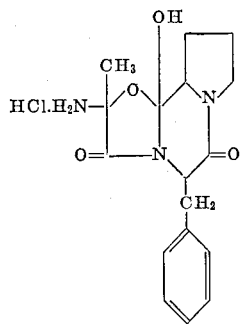

3. The process as in claim 1, wherein the product has the formula:

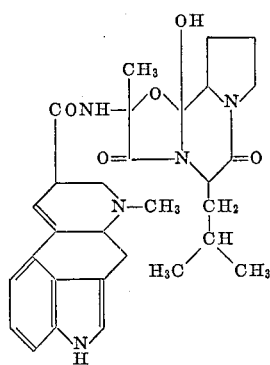

and comprises reacting (+)-lysergic acid chloride hydrochloride with a salt of the formula:

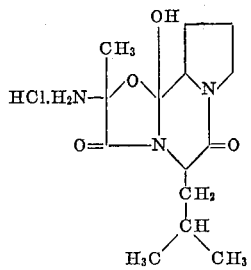

4. Ergostine.
5. Ergostinine.
6. 9,10-dihydro-ergostine.
7. Ergovaline.
8. Ergovalinine.
9. 9,10-dihydro-ergovaline.
10. The process as claimed in claim 2, wherein the inert solvent is chloroform and the tertiary amine base is added dropwise to the solvent medium containing the reactants.

References Cited

UNITED STATES PATENTS

| | | | |
|---|---|---|---|
| 3,030,366 | 4/1962 | Biel | 260—268 |
| 3,041,341 | 6/1962 | Barrett et al. | 260—268 |
| 3,051,710 | 8/1962 | Biel | 260—268 |
| 3,084,164 | 4/1963 | Frey | 260—268 |

OTHER REFERENCES

Garbrecht: "Journ. Organic Chem.," vol. 24, pages 368–372, 1959.

Kornfield et al.: "Journ. American Chem. Soc.," vol. 78, pages 3087–3114, pages 3087–3088 relied upon, 1956.

ALEX MAZEL, *Primary Examiner.*

HENRY R. JILES, *Examiner.*

J. W. ADAMS, *Assistant Examiner.*